United States Patent
Kim et al.

(10) Patent No.: US 10,444,948 B2
(45) Date of Patent: Oct. 15, 2019

(54) APPARATUS, METHOD AND COMPUTER PROGRAM FOR DISPLAYING WEB PAGES

(71) Applicant: NAVER CORPORATION, Seongnam-si (KR)

(72) Inventors: Hyo Kim, Seongnam-si (KR); Min Chul Jeong, Seongnam-si (KR); Myeong Jin Cho, Seongnam-si (KR); Ji Ho Choi, Seongnam-si (KR); Yun Seok Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 130 days.

(21) Appl. No.: 15/380,344

(22) Filed: Dec. 15, 2016

(65) Prior Publication Data

US 2017/0169043 A1 Jun. 15, 2017

(30) Foreign Application Priority Data

Dec. 15, 2015 (KR) .................. 10-2015-0179209

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 16/954* (2019.01); *G06F 16/957* (2019.01); *G06F 2203/04803* (2013.01)

(58) Field of Classification Search
CPC .......... G06F 17/3089; G06F 17/30887; G06F 3/0483; G06F 3/0482; G06F 17/30867; G06F 2203/04803
(Continued)

(56) References Cited

U.S. PATENT DOCUMENTS

2006/0218500 A1* 9/2006 Sauve .................. G06F 3/0481
                                                              715/767
2006/0224951 A1* 10/2006 Burke .................. G06F 16/957
                                                              715/234
(Continued)

FOREIGN PATENT DOCUMENTS

JP           2008084006 A     4/2008
KR     10-2012-0026227        3/2012
(Continued)

OTHER PUBLICATIONS

Office action and Decision of rejection issued in corresponding Korean Patent Application No. 10-2015-0179209, dated Feb. 28, 2017.
(Continued)

*Primary Examiner* — Stephen S Hong
*Assistant Examiner* — Broderick C Anderson
(74) *Attorney, Agent, or Firm* — Greer Burns & Crain, Ltd.

(57) ABSTRACT

Provided is a method of displaying web pages, performed by an electronic apparatus including a display displaying a first web page in a display region. The method includes receiving, from a user, an input for selecting a first link included in the first web page; and splitting the display region into a plurality of section regions, displaying the first web page in a first section region from among the plurality of section regions, and displaying a second web page corresponding to the first link in a second section region different from the first section region.

19 Claims, 9 Drawing Sheets

(51) Int. Cl.
    *G06F 16/957*    (2019.01)
    *G06F 16/954*    (2019.01)
(58) Field of Classification Search
    USPC .......................................................... 715/760
    See application file for complete search history.

(56)            References Cited

U.S. PATENT DOCUMENTS

2006/0277167 A1*  12/2006  Gross .................. G06F 16/9577
2008/0306933 A1*  12/2008  Valliani ............... G06F 16/9577
2012/0311419 A1   12/2012  Kwak et al.
2013/0086507 A1*   4/2013  Poston .................. G06F 3/0483
                                                      715/777
2014/0101535 A1    4/2014  Kim et al.
2017/0193107 A1*   7/2017  Imbruce .............. G06F 16/9535
2017/0357437 A1*  12/2017  Peterson ............... G06F 3/0486
2018/0365198 A1*  12/2018  Kim ...................... G06F 17/212

FOREIGN PATENT DOCUMENTS

KR      10-2014-0046329         4/2014
KR         1020140137633 A     12/2014
KR           2015-0087960 A     7/2015

OTHER PUBLICATIONS

Office Action issued in corresponding Japanese Patent application No. 2016-242676, dated Nov. 21, 2017.
Notice of Allowance of the Korean Patent App. No. 10-2016-0157422, which is a Divisional App. of the Korean Priority App. No. 10-2015-0019730, dated Aug. 10, 2017.

* cited by examiner

APPARATUS, METHOD AND COMPUTER PROGRAM FOR DISPLAYING WEB PAGES

CROSS-REFERENCE TO RELATED APPLICATION

This application claims priority under 35 U.S.C. § 119 to Korean Patent Application No. 10-2015-0179209 filed on Dec. 15, 2015, in the Korean Intellectual Property Office, the entire contents of which are incorporated herein by reference.

BACKGROUND

1. Field

One or more embodiments of the present invention relate to an apparatus, method, and computer program for displaying web pages, and more particularly, to an apparatus, method, and computer program for displaying web pages, wherein one display region is split into a plurality of section regions and a plurality of web pages are respectively displayed in the plurality of section regions.

2. Description of the Related Art

This section provides background information related to the present disclosure which is not necessarily prior art.

A web browser is an application program used to search for information through the Internet. The web browser is also referred to as a browser or an internet browser. Users may perform various activities through the web browser, for example, view an image, exchange emails, and download or upload various materials. General functions of the web browser include a function of opening a web page, functions of providing a recently visited Internet address (uniform resource locator (URL)) and bookmarks, and a function of storing a web page.

SUMMARY

This section provides a general summary of the disclosure, and is not a comprehensive disclosure of its full scope or all of its features.

One or more embodiments include an apparatus, method, and computer program for displaying web pages, wherein, in response to an input for generating a web page, a display region of the web page is determined as a separate display region, in consideration of a characteristic of the web page.

One or more embodiments include an apparatus, method and computer program for displaying web pages, wherein, with respect to generating of a second web page corresponding to a link included in a first web page in response to an input for selecting the link, a display region for the second web page is determined in consideration of a relation between the first web page and the second web page.

Additional aspects will be set forth in part in the description which follows and, in part, will be apparent from the description, or may be learned by practice of the presented embodiments.

According to one or more embodiments, a method of displaying web pages, performed by an electronic apparatus including a display displaying a first web page in a display region includes: receiving, from a user, an input for selecting a first link included in the first web page; and splitting the display region into a plurality of section regions, displaying the first web page in a first section region from among the plurality of section regions, and displaying a second web page corresponding to the first link in a second section region different from the first section region.

The displaying of the second web page may include determining whether an address of the second web page satisfies a split display condition, wherein the display region may be split into the plurality of section regions, the first web page may be displayed in the first section region from among the plurality of section regions, and the second web page may be displayed in the second section region different from the first section region, only when it is determined that the address of the second web page satisfies the split display condition.

When it is determined that the address of the second web page does not satisfy the split display condition, the display region may not split into the plurality of section regions and the second web page may be displayed in the display region.

The determining of whether the address of the second web page satisfies the split display condition may include determining whether the first web page is a page including a search result corresponding to a keyword input from the user, wherein when it is determined that the first web page includes the search result corresponding to the keyword, it may then be determined whether the address of the second web page satisfies the split display condition.

The split display condition may include at least one of whether the address of the second web page includes a uniform resource locator (URL) included in an address of the first web page, whether the address of the second web page includes 'http', and whether the second web page is set to be displayed in a separate display window.

The method may further include: receiving, from the user, an input for selecting a second link included in the first web page; and determining whether an address of a third web page corresponding to the second link satisfies the split display condition, and when it is determined that the address of the third web page satisfies the split display condition, displaying the third web page in the second section region.

The displaying of the third web page in the second section region may include displaying the third web page and the second web page to completely overlap each other while an index of the second web page and an index of the third web page do not overlap each other in a part of the second section region, and displaying the third web page on the second web page according to a generation order of web pages, wherein an index of each web page may be a region in which all or some of a title of each web page is displayed.

The method may further include receiving, from the user, an input for selecting the index of the second web page, and displaying the second web page foremost in the second section region according to the input.

The method may further include: receiving, from the user, an input for selecting a third link included in the second web page; and displaying a fourth web page corresponding to the third link in the second section region.

According to one or more embodiments, an apparatus for displaying web pages includes: a display configured to display a first web page in a display region; and a non-transitory computer-readable storage medium, wherein the non-transitory computer-readable storage medium stores a plurality of functional units executed by a processor. The functional units include an input controller for receiving, from a user, an input for selecting a first link included in a first web page; and a display controller for splitting the display region into a plurality of section regions according to the input for selecting the first link, displaying the first web page in a first section region from among the plurality of section regions, and displaying a second web page corresponding to the first link in a second section region different from the first section region.

The non-transitory computer-readable storage medium may further include a condition determiner for determining whether an address of the second web page satisfies a split display condition according to the input for selecting the first link, wherein the display controller may split the display region into the plurality of section regions only when it is determined that the address of the second web page satisfies the split display condition, display the first web page in the first section region from among the plurality of section regions, and display the second web page in the second section region different from the first section region.

The display controller may not split the display region into the plurality of section regions but display the second web page in the display region when it is determined that the address of the second web page does not satisfy the split display condition.

The condition determiner may determine whether the first web page is a page including a search result corresponding to a keyword input from the user, and determine whether the address of the second web page satisfies the split display condition only when it is determined that the first web page comprises the search result corresponding to the keyword.

The split display condition may include at least one of whether the address of the second web page includes a uniform resource locator (URL) included in an address of the first web page, whether the address of the second web page includes 'http', and whether the second web page is set to be displayed in a separate display window.

The input controller may receive, from the user, an input for selecting a second link included in the first web page, the condition determiner may determine whether an address of a third web page corresponding to the second link satisfies the split display condition according to the input for selecting the second link, and the display controller may display the third web page in the second section region when it is determined that the address of the third web page satisfies the split display condition.

The display controller may display the third web page and the second web page to completely overlap each other while an index of the second web page and an index of the third web page do not overlap each other in a part of the second section region, and display the third web page on the second web page according to a generation order of web pages, wherein an index of each web page may be a region in which all or some of a title of each web page is displayed.

The input controller may receive, from the user, an input for selecting the index of the second web page, and the display controller may display the second web page foremost in the second section region according to the input for selecting the index of the second web page.

The input controller may receive, from the user, an input for selecting a third link included in the second web page, and the display controller may display a fourth web page corresponding to the third link in the second section region.

According to one or more embodiments, a non-transitory computer-readable recording medium has recorded thereon a computer program which, when executed by a computer, instructs the computer to perform the method of displaying web pages described above.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
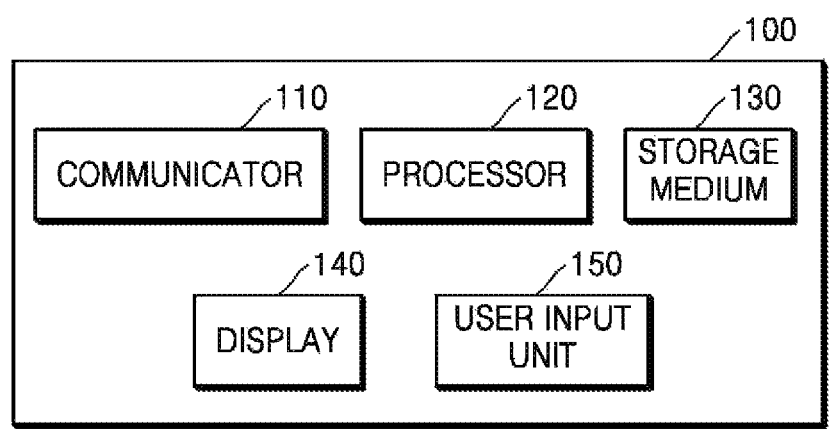
FIG. 1 is a block diagram of a structure of an apparatus for displaying web pages, according to an embodiment.

It should be noted that these figures are intended to illustrate the general characteristics of methods and/or structure utilized in certain example embodiments and to supplement the written description provided below. These drawings are not, however, to scale and may not precisely reflect the structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a block diagram of a structure of an apparatus 100 for displaying web pages, according to an embodiment.

Referring to FIG. 1, the apparatus 100 according to an embodiment includes a communicator 110, a processor 120, and a storage medium 130.

The apparatus 100 performs a function of a web browser that generates and provides a web site or a web page in response to a request, for example, a search request or a page generation request, of a user. The apparatus 100 receives a program code from a server (not shown) for generating a web page corresponding to a request by the user, and displays a web page according to the program code. Here, the server has a network address and transmits, to the apparatus 100 that is a user terminal, a response including the network address, a uniform resource locator (URL), etc. The server is a general computer apparatus, and may include at least one processor and at least one storage medium.

The user controls the apparatus 100 such that a display region is freely set and a plurality of web pages are displayed in the display region. The plurality of web pages may be displayed to overlap each other partially or completely. Here, the display region may include a close button, a minimize button, and a maximize button, and may include an index region displaying a title of a web page. (See FIGS. 8A-8B.)

Also, through an input for selecting a title or a partial region of a web page, the apparatus 100 may control the web page to be displayed foremost. The apparatus 100 may display an index or tab including information of a web page opened at the top of the display region. The apparatus 100 may display an arbitrary web page from among a plurality of web pages opened in the entire region of the display region, and when an input for selecting another index is received from the user, display a web page corresponding to the selected index foremost on the display region.

Figure 9A:
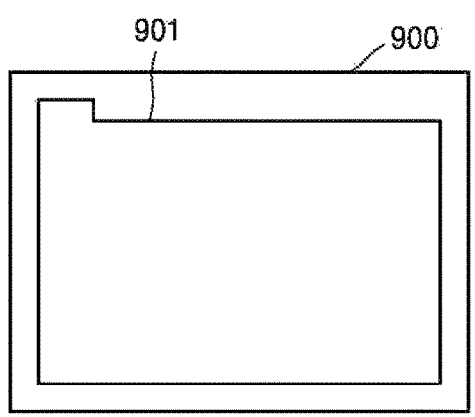
Figure 9B:
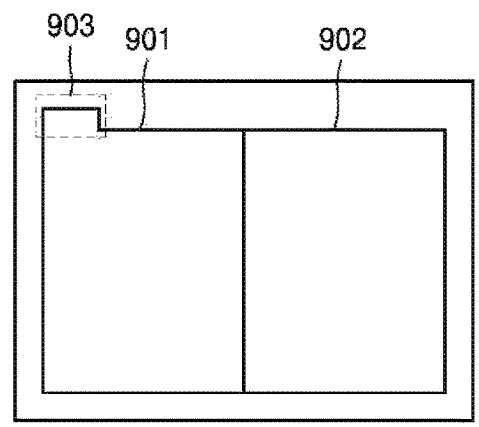

Also, the apparatus 100 may generate a separate display region from the display region that is being currently displayed according to a request by the user or a program code for generating a web page, and display a web page in the separate display region (See FIGS. 9A-9B.). The apparatus 100 includes a split display mode, and displays web pages respectively on split regions in the split display mode. According to the current embodiment, when the apparatus 100 is not in the split display mode, the apparatus 100 may not display web pages on split regions. In particular, even when there is no request by the user, the apparatus 100 may determine whether a web page being displayed and a web page to be displayed are related to each other, and when it is determined that the web page being displayed and the web page to be displayed are related to each other, newly generate a display region for displaying the web page to be displayed such that the web page being displayed and the web page to be displayed are simultaneously displayed.

The apparatus 100 may further display an address bar (not shown) for receiving a network address, a URL, or a keyword, and generate a web page corresponding to the network address, the URL, or the keyword input through the address bar. The apparatus 100 may generate a display region including a status bar for displaying generation, access, or progression of a web page, a close button for closing a web page, and a title bar for displaying a title of a web page (not shown).

The apparatus 100 may receive a program code from a server for generating a web page according to a request by the user, and generate a web page according to the program code by interpreting the program code. The program code for generating a web page may be realized in any one of various computer programming languages, such as Java Script or HTML. The apparatus 100 may store data for interpreting a program code for generating a web page.

The communicator 110 may be an apparatus including hardware and software required to transmit and receive a signal, such as a control signal or a data signal, to and from another network apparatus via wired/wireless connection.

The processor 120 generally controls overall operations of the apparatus 100. For example, the processor 120 may control not only control software stored in the storage medium 130, but also an input controller 131, a condition determiner 132, and a display controller 133 of FIG. 2.

The processor 120 may be a data processing apparatus embedded in hardware, which has a physically structured circuit so as to perform a function expressed in a code or command included in a program. Examples of the data processing apparatus embedded in hardware may include processing apparatuses, such as a microprocessor, a CPU, a processor core, a multiprocessor, an application-specific integrated circuit (ASIC), and a FPGA, but are not limited thereto.

The storage medium 130 denotes a storage apparatus included in the apparatus 100 or electrically connected to the apparatus 100. The storage medium 130 may store a plurality of functional modules for operations of the apparatus 100.

The storage medium 130 may include a storage medium of at least one type from among a flash memory type, a hard disk type, a multimedia card micro type, a card type (for example, secure digital (SD) or extreme digital (XD) card type), a RAM type, a static random access memory (SRAM) type, a ROM type, an electrically erasable programmable read-only memory (EEPROM) type, a programmable read-only memory (PROM) type, a magnetic memory type, a magnetic disk type, and an optical disk type. Also, the apparatus 100 may operate a web storage or cloud server performing a storage function of the storage medium 130 on the Internet.

Also, the apparatus 100 according to an embodiment may further include a display 140 for displaying image data, and a user input unit 150 for receiving data, an input, a request, etc. from the user.

The display 140 may include at least one of a liquid crystal display (LCD), a thin-film transistor-liquid crystal display (TFT-LCD), an organic light-emitting diode (OLED), a flexible display, a 3-dimensional (3D) display, and an electrophoretic display. Also, the apparatus 100 may include two or more displays 140 based on a structure of the apparatus 100. In this case, the two or more displays 140 may face each other by using a hinge.

The user input unit 150 is used to receive a request from the user, and may be a keypad, a dome switch, a touch pad (a contact capacitance type, a pressure resistance film type, an infrared detection type, a surface ultrasonic conduction type, an integral tension measuring type, or a Piezo-effect type), a jog wheel, or a jog switch, but is not limited thereto.

Figure 2:
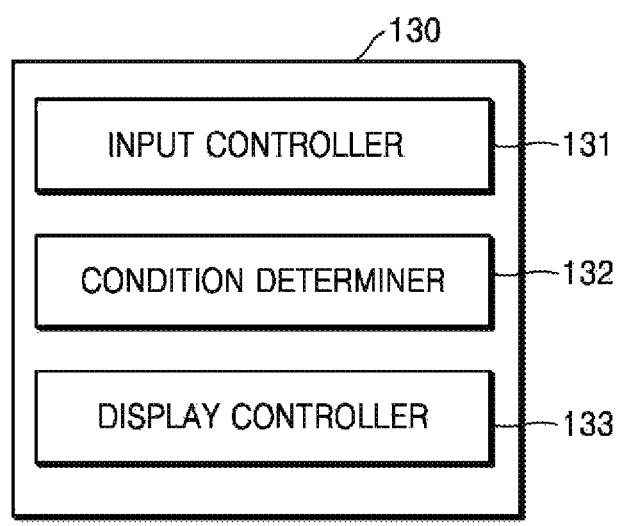
FIG. 2 is a block diagram of a structure of a storage medium, according to an embodiment.

FIG. 2 is a block diagram of a structure of the storage medium 130, according to an embodiment.

Referring to FIG. 2, the storage medium 130 stores the input controller 131, a condition determiner 132, and the display controller 133, which are functional units in the form of computer programs, program code, instructions, or some combination thereof, which are executed by the processor 120.

The input controller 131 generates an input corresponding to data input through the user input unit 150. The input controller 131 receives an input for generating a web page, an input for closing a web page, an input for adjusting a size of a web page, and an input for moving a web page. The input controller 131 may receive, from the user, an input for generating a first web page and an input for selecting at least one link included in the first web page.

The condition determiner 132 determines whether an address of a second web page to be generated satisfies a split display condition, in response to the input for selecting at least one link included in the first web page. Here, the split display condition is a condition for splitting a display region into two section regions and displaying the first and second web pages respectively in the two section regions. The condition determiner 132 may determine that the second web page is to be displayed in a separate section region on the display region when the address of the second web page includes the same URL as an address of the first web page, when the address of the second web page includes 'http', or when the address of the second web page includes 'target="_blank"'.

When it is determined that the address of the second web page satisfies the split display condition, the display controller 133 may split the display region into a plurality of section regions, display the first web page in a first section region from among the plurality of section regions, and display the second web page in a second section region. Accordingly, the apparatus 100 according to an embodiment may simultaneously display a plurality of web pages without an overlap. The display controller 133 may split the display region in consideration of the number of web pages to be displayed and/or a threshold number of regions set by the user. For example, when the number of web pages to be displayed is 3, the display controller 133 may split the display region into 3 section regions. When the threshold number of regions set by the user is 2, the display controller 133 may split the display region into at most 2 section regions. Also, the display region 133 may split the display region into the plurality of section regions by splitting the display region in a horizontal direction, in a vertical direction, or alternately in horizontal and vertical directions.

Generally, the display controller 133 controls displaying of a web page in response to an input request. In response to an input for generating a web page, which includes an address of a web page, the display controller 133 displays the web page corresponding to the address. In response to an input for closing a web page, the display controller 133 closes the web page. In response to an input for adjusting a size of a web page, the display controller 133 adjusts a size of a display region of the web page. The display controller 133 displays the web page in the display region having the adjusted size. When the size of the display region is increased, the display controller 133 may enlarge the web page or extend a region where the web page is displayed. When the size of the display region is decreased, the display controller 133 may reduce the web page or reduce the region where the web page is displayed.

When the first web page is displayed throughout the display region, the display controller 133 splits the display region into two section regions and displays one web page in one section region, in order to independently display the second web page corresponding to the first link included in the first web page. The display controller 133 may distinguishably display web pages generated through a link included in the first web page displayed in the first section region and web pages generated through a link included in the second web page displayed in the second section region. For example, the display controller 133 may consider the relationship between addresses of the web pages generated through the link included in the first web page displayed in the first section region and the address of the first web page, and when the addresses of the web pages generated through the link included in the first web page and the address of the first web page include the same URL or the same file name, determine that the web pages generated through the link included in the first web page are related to the first web page, and thus split the display region such that the web pages generated through the link included in the first web page and the first web page are simultaneously displayed, and display the web pages and the first web page respectively in the section regions. Also, when the addresses of the web pages generated through the link included in the first web page are set to be displayed through a separate window or include 'http', the display controller 133 may also split the display region such that the web pages generated through the link included in the first web page and the first web page are simultaneously displayed, and display the web pages and the first web page respectively in the section regions. When the addresses of the web pages generated through the link included in the first web page and the address of the first web page do not include the same URL or the same file name, the display controller 133 may display the web pages generated through the link included in the first web page in the first section region of the first web page or throughout the display region without splitting the display region. In order to independently display n web pages, the display controller 133 splits a display region into n section regions, and displays the n web pages respectively in the n section regions.

A user interface (UI) after the display region is split will now be described. For example, it is assumed that the apparatus 100 has split a display region into two section regions, displays a first web page in a first section region, and displays a second web page in a second section region. (See FIGS. 9A and 9B.)

When an input for selecting a first link included in the first web page is received through the input controller 131, the condition determiner 132 determines whether an address of a third web page corresponding to the first link satisfies a split display condition, and when it is determined that the address of the third web page satisfies the split display condition, may display the third web page on the second web page in the second section region in consideration of a relation between the first web page and the third web page, in order to display the third web page. When it is determined that the address of the third web page does not satisfy the split display condition, it is determined that the third web page is not required to be displayed simultaneously with the first web page, and the display controller 133 may display the third web page in the first section region. (See FIGS. 10A-10D.)

When an input for selecting a second link included in the second web page is received through the input controller 131, the display controller 133 displays a fourth web page corresponding to the second link in the second section region without a determining process of the condition determiner 132.

Also, the condition determiner 132 may determine whether a split display condition is satisfied in consideration of not only an address of a web page displayed through a link included in a first web page, but also a characteristic of the first web page. The condition determiner 132 may determine whether a split display condition is satisfied only when a first web page includes a search result, for example, list information such as a posting list.

When a first web page including a list, such as a search result, and a second web page corresponding to a link included in the first web page are displayed, it may be inconvenient because a user has to set one or more links included in the first web page to be respectively displayed in one or more new display regions or has to repeatedly perform processes of checking the second web page after the first web page, returning back to the first web page, and then selecting another link, in order to sequentially open and check the one or more links included in the first web page.

In order to avoid such inconvenience, the apparatus 100 according to an embodiment may display a first web page including a list, such as a search result of A, and web pages corresponding to links included in the first web page in independent and separate regions.

FIGS. 3 through 7 are flowcharts of a method of displaying web pages, according to an embodiment.

Figure 3:
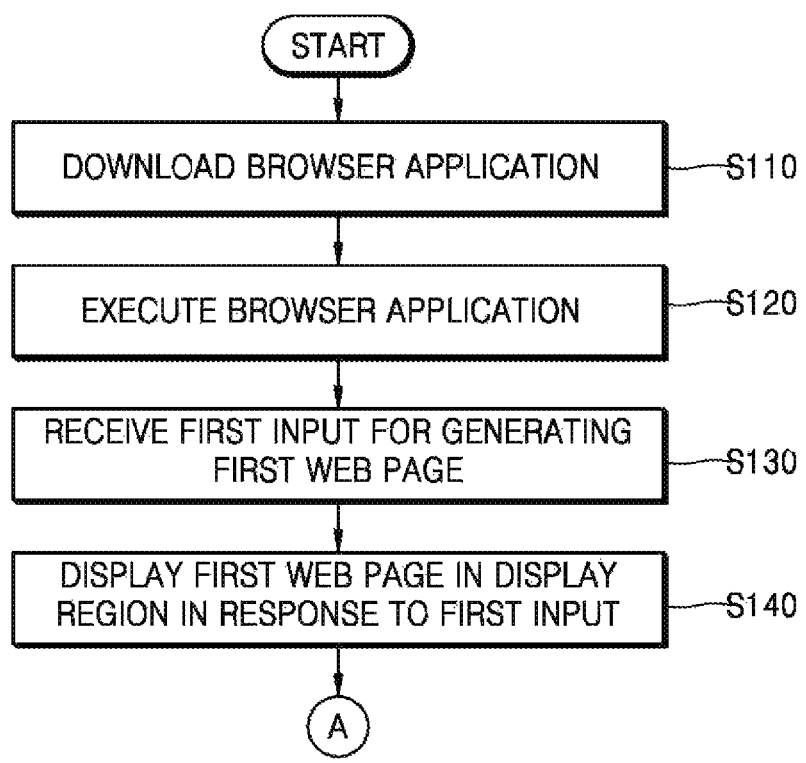
FIGS. 3 through 7 are flowcharts of a method of displaying web pages, according to an embodiment.

Referring to FIG. 3, the method according to an embodiment may include downloading of a browser application (operation S110), executing of the browser application (operation S120), receiving of a first input for generating a first web page (operation S130), and displaying of the first web page (operation S140).

In operation S110, the apparatus 100 may download a browser application from an external server. The browser application may perform a browser function by requesting an Internet web server for data, and generating and displaying a web page based on the received data. In operation S120, the apparatus 100 executes the browser application. In operation S130, the apparatus 100 receives a first input for generating a first web page through the user input unit 150. In operation S140, the apparatus 100 displays the first web page in a display region, in response to the first input. Here, the display region is a region set by a user, and may be an entire region or a partial region of the display 140. The apparatus 100 may freely adjust the display region according to a user's input.

Figure 4:
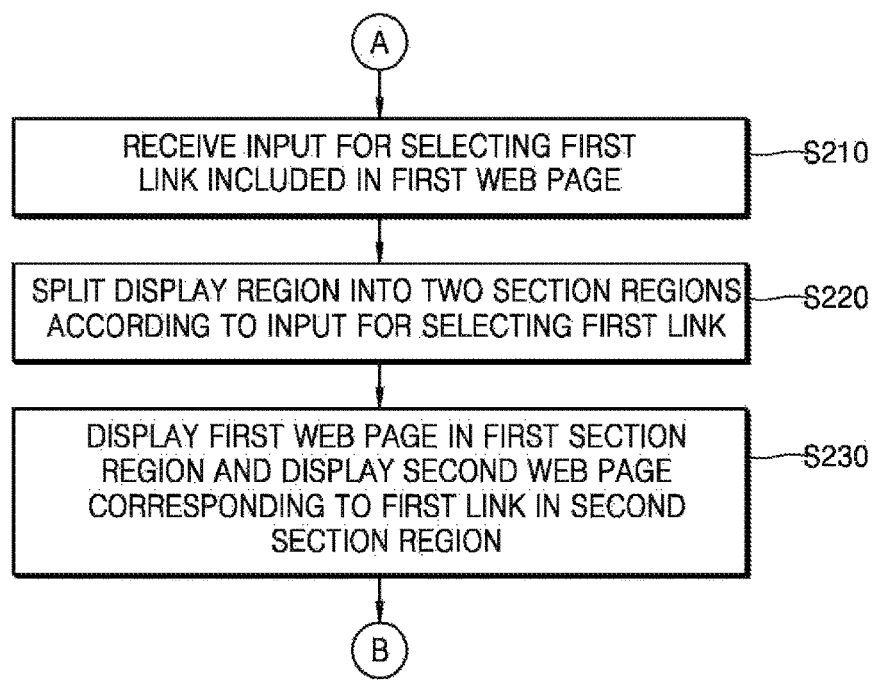

Referring to FIG. 4, the method may further include receiving of an input for selecting a first link included in the first web page (operation S210), splitting of the display region (operation S220), and displaying of a second web page (operation S230).

In operation S210, the apparatus 100 receives an input for selecting a first link included in the displayed first web page, through the user input unit 150. In operation S220, the apparatus 100 splits the display region into two section regions according to the input for selecting the first link. In operation S230, the apparatus 100 displays the first web page in a first section region, and displays a second web page corresponding to the first link in a second section region. In a general or conventional apparatus for displaying web pages, a plurality of web pages are displayed in one display region, wherein the plurality of web pages overlap each other entirely or partially. In this case, in order to view the plurality of web pages simultaneously, the general apparatus has to receive, from a user, inputs such that a separate display region is newly generated and a second web page is displayed in the separate display region. However, according to the apparatus 100 of an embodiment, when the second web page is to be displayed according to the input for selecting the first link included in the first web page being displayed, the display region may be split into two section regions such that the first and second web pages are simultaneously displayed; the first web page may be displayed in the first section region, and the second web page may be displayed in the second section region. Here, a split display condition may include at least one of whether an address of the second web page includes all or some of a URL included in the first web page, whether the address of the second web page includes 'http', and whether the second web page is set to be displayed in a separate display region.

For example, when the address of the first web page is
"https://search.naver.com/
search.naver?where=kin&ie=utf8&query=%EB%
89%B4%EC%A7%88EB%9E%9C%EB%93%9C&sm=tab_stc"
and the address of the second web page is
"https://search.naver.com/
search.naver?where=kin&ie=utf8&kin_sort=0&kin_display=10&qt=&df=200"
the addresses of the first and second web pages include the same URL and the same file name, i.e., "https://search-.naver.com/search.naver", and thus the apparatus 100 may determine that the first and second web pages need to be simultaneously displayed, and split the display region.

In particular, the apparatus 100 according to an embodiment may simultaneously display the first web page including a search result of a certain keyword and the second web page generated through one or more links included in the search result. Accordingly, the apparatus 100 may easily compare a web page displaying a search result of a keyword and a web page related to the keyword and included in the search result.

According to another embodiment, the apparatus 100 may generate a plurality of section regions by splitting a display region based on the number of web pages to be displayed.

Figure 5:
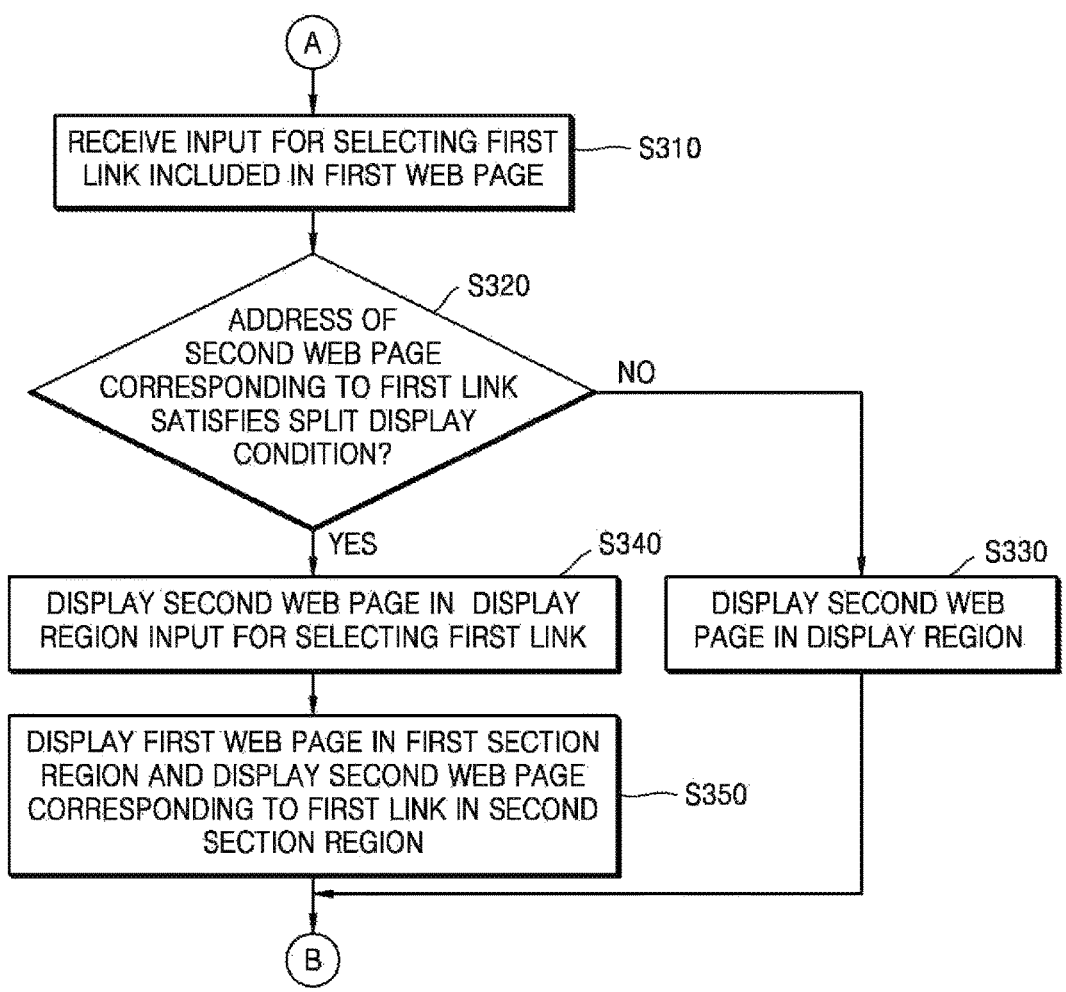

Referring to FIG. 5, the method may further include receiving of an input for selecting the first link (operation S310), determining of a split display condition (operation S320), splitting of the display region (operation S340), and displaying of the second web page (operation S330) and the first and second web pages (operation S350). When the first web page is a web page displaying a list including a plurality of items, such as search results or postings, the apparatus 100 may determine that a web page generated through a link included in the first web page need to be displayed simultaneously with the first web page.

In operation S310, the apparatus 100 receives an input for selecting the first link included in the first web page displayed throughout or in a part of the display region. In operation S320, the apparatus 100 determines whether an address of the second web page corresponding to the first link satisfies a split display condition. Here, the split display condition is a condition for determining whether to split the display region of the first web page such that the first web page being displayed and the second web page to be displayed are simultaneously displayed. In order to prevent the display region from being split into smaller sections and web pages from being displayed in a smaller area, the apparatus 100 splits the display region into a plurality of section regions, for example, two section regions, only when the address of the second web page satisfies the split display condition, and displays the first web page in the first section region and the second web page in the second section region. In operation S330, when it is determined that the address of the second web page does not satisfy the split display condition, the apparatus 100 displays the second web page in the display region without splitting the display region. In operation S340, when it is determined that the address of the second web page satisfies the split display condition, the apparatus 100 splits the display region into the two section regions according to the input for selecting the first link. In operation S350, the apparatus 100 displays the first web page in the first section region and the second web page in the second section region.

Figure 6:
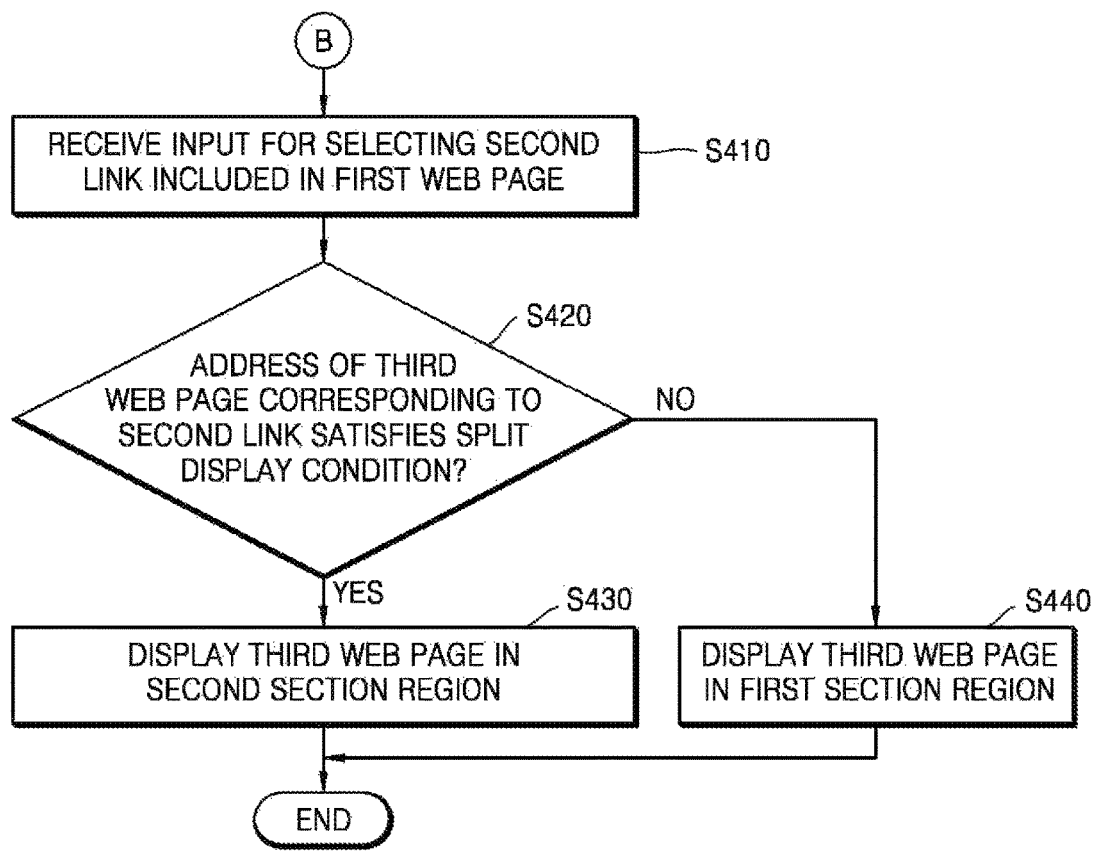

Referring to FIG. 6, the method according to an embodiment may further include receiving of an input for selecting a second link (operation S410), determining of whether split display condition is satisfied (operation S420), and displaying of a third web page (operations S430 and S440).

In the current embodiment, a UI after a display region is split into two section regions is described. In particular, the apparatus 100 according to an embodiment may perform processes of selecting a section region in which a web page corresponding to a link included in a first web page displayed in a first section region is to be displayed when the link is selected. In particular, when a third web page includes a list of a plurality of links as in the first web page, the apparatus 100 may display the third web page instead of the first web page.

In operation S410, the apparatus 100 receives an input for selecting a second link included in the first web page. In operation S420, the apparatus 100 determines whether an address of a third web page corresponding to the second link satisfies the split display condition. In operation S430, when it is determined that the address of the third web page satisfies the split display condition, the apparatus 100 may display the third web page in the second section region. Here, the apparatus 100 may display the third web page to overlap the second web page, while displaying the third web page on the second web page according to the generation order of web pages. Also, in order to display information about a web page that is not shown because the web page is not displayed foremost on a section region, the apparatus 100 may display indexes or tabs including all or some of titles of the second and third web pages in parts of the second section region. Here, the indexes are displayed obviously not to overlap each other, and are displayed in a direction from left to right. Here, the indexes may be combined with the first web page.

In operation S440, when it is determined that the address of the third web page does not satisfy the split display condition, the apparatus 100 may display the third web page in the first section region. Here, the apparatus 100 may display the third web page after closing the first web page, or overlapped on the first web page. When the third web page is displayed on the first web page, the apparatus 100 generates indexes including all or some of titles of the first and third web pages. The third web page to be displayed in the first section region that is a display region of the first web page may be, as in the first web page, a page including a list, such as a search result or a posting list.

Figure 7:
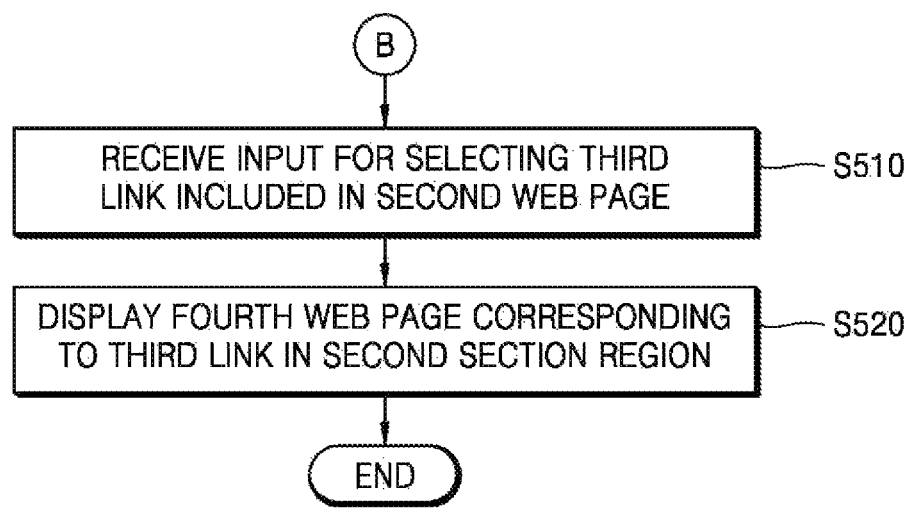

Referring to FIG. 7, the method according to an embodiment may further include receiving of an input for selecting a third link (operation S510) and displaying of a fourth web page (operation S520).

In the current embodiment, when an input for selecting a link included in a second web page displayed in a second section region is received, a web page corresponding to the link may be displayed in the second section region as with the second web page.

In operation S510, the apparatus 100 receives an input for selecting a third link included in the second web page displayed in the second section region. In operation S520, the apparatus 100 may display a fourth web page corresponding to the third link in the second section region without considering the address of the fourth web page.

FIGS. 8A through 10D illustrate examples of UIs displayed by the apparatus 100.

Figure 8A:
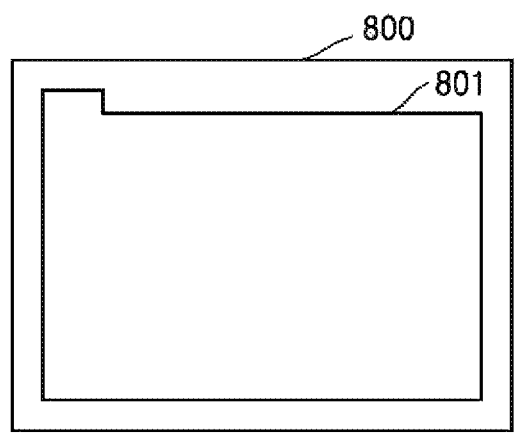
FIGS. 8A-8B, 9A-9B, and 10A-10D illustrate examples of user interfaces (UIs) displayed by an apparatus for displaying web pages.
Figure 8B:
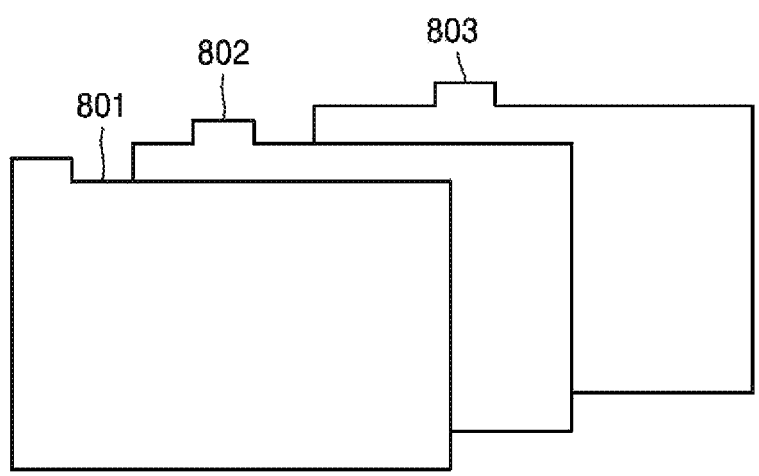

FIGS. 8A and 8B illustrate UIs displaying a plurality of web pages, i.e., a first web page 801 and web pages 802 and 803, through a display region 800 without being split by the apparatus 100.

The apparatus 100 displays the first web page 801 in the display region 800 according to a user's request. Generally, when new web pages are to be generated according to an input for selecting a link included in the first web page 801, the apparatus 100 generates and displays the web pages 802 and 803 overlappingly in the display region 800.

FIGS. 9A and 9B illustrate UIs displaying a plurality of web pages, i.e., first and second web pages 901 and 902, through a plurality of section regions obtained when the apparatus 100 splits one display region 900.

The apparatus 100 displays the first web page 901 in the display region 900 according to a user's request. When an input for selecting a first link included in the first web page 901 is received, the apparatus 100 may determine whether to split the display region 900 and determine a display region of the second web page 902, in consideration of an address of the second web page 902 corresponding to a characteristic or the first link of the first web page 901. In detail, when the first web page 901 includes list information, such as a search result about a certain keyword, the apparatus 100 may split the display region 900 into a plurality of sections, and display the first web page 901 in a first section region and the second web page 902 corresponding to the first link in a second section region. According to another embodiment, when an address of the second web page 902 satisfies a split display condition, the apparatus 100 may split the display region 900 into the plurality of section regions, and display the first web page 901 in the first section region and the second web page 902 in the second section region. As shown in FIG. 9B, the apparatus 100 according to an embodiment may display the first and second web pages 901 and 902 displayed in different section regions, as one index 903. The index 903 may include all or some of a title of the first web page 901, or all or some of a title of the second web page 902.

FIGS. 10A through 10D illustrate different UIs displaying a plurality of web pages through a plurality of sections obtained when the apparatus 100 splits one display region 1000.

Figure 10A:
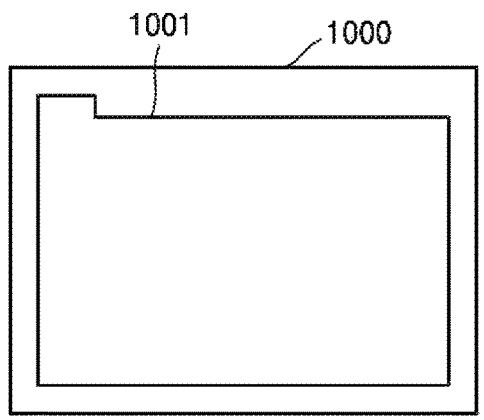
Figure 10B:
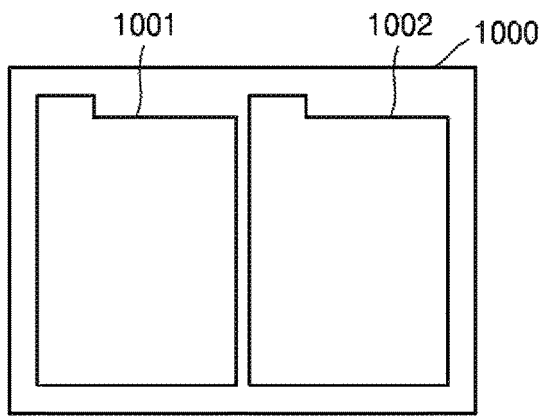

The apparatus 100 displays a first web page 1001 in the display region 1000 according to a user's request or input. When an input for selecting a first link included in the first web page 1001 is received, the apparatus 100 may determine whether to split the display region 1000 and determine a display region of a second web page 1002 corresponding to the first link, in consideration of an address of the second web page 1002 or a characteristic of the first web page 1001. When the address of the second web page 1002 satisfies a split display condition, the apparatus 100 may split the display region 1000 into a plurality of sections, and display the first web page 1001 in a first section region and display the second web page 1002 in a second section region. Here, as shown in FIG. 10B, the apparatus 100 may display an index of the first web page 1001 and an index of the second web page 1002 respectively in parts of the first and second section regions.

Figure 10C:
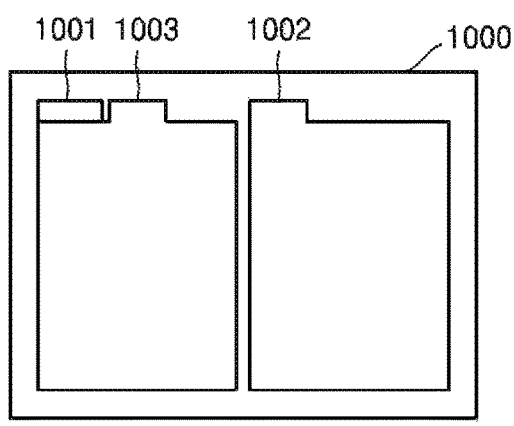
Figure 10D:
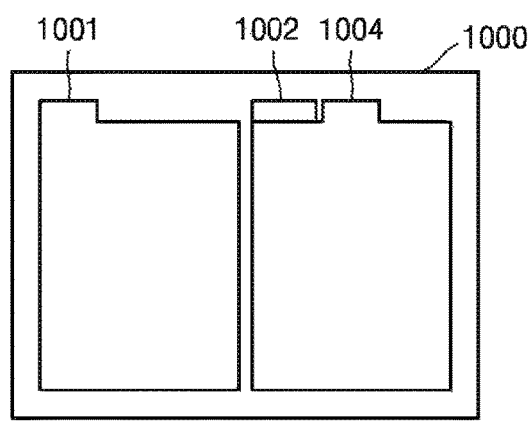

The apparatus 100 may display, in the first section region, a third web page 1003 corresponding to a second link included in the first web page 1001, according to an input for selecting the second link. The apparatus 100 may close the first web page 1001 and display the third web page 1003, or as shown in FIG. 10C, may display the third web page 1003 overlappingly on the first web page 1001. Here, the apparatus 100 may display indexes including all or some of titles of the first and third web pages 1001 and 1003 not to overlap each other. The apparatus 100 may display, in the second section region, a fourth web page 1004 corresponding to a link included in the second web page 1002, according to an input for selecting the link included in the second web page 1002. As shown in FIG. 10D, the apparatus 100 may display the fourth web page 1004 on the second web page 1002, and generate and display indexes of the second and fourth web pages 1002 and 1004 not to overlap each other.

According to one or more embodiments, in response to an input for generating a web page, a display region of the web page may be separately determined in consideration of a characteristic of the web page.

Also, according to one or more embodiments, while generating a second web page corresponding to a link included in a first web page in response to an input for selecting the link included in the first web page, a display region of the second web page may be determined in consideration of a relation between the first and second web pages.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of displaying web pages, performed by an electronic apparatus including a display displaying a first web page in a display region, the method comprising:
   receiving, from a user, an input for selecting a first link included in the first web page;
   splitting the display region into a plurality of section regions, displaying the first web page in a first section region from among the plurality of section regions, and displaying a second web page corresponding to the first link in a second section region different from the first section region;
   receiving, from the user, an input for selecting a second link included in the first web page after the second section region has been displayed on the display; and
   determining whether an address of a third web page corresponding to the second link satisfies a first split display condition, and when it is determined that the address of the third web page does not satisfy the first split display condition, displaying the third web page in the first section region, overlapping the first webpage.

2. The method of claim 1, wherein the splitting of the display region comprises determining whether an address of the second web page satisfies a second split display condition, and
   Wherein the display region is split into the plurality of section regions, the first web page is displayed in the first section region, and the second web page is displayed in the second section region, only when it is determined that the address of the second web page satisfies the second split display condition.

3. The method of claim 2, wherein, when it is determined that the address of the second web page does not satisfy the second split display condition, the second web page is displayed in the display region without the display region being split into the plurality of the section regions.

4. The method of claim 2, wherein the determining of whether the address of the second web page satisfies the second split display condition comprises determining whether the first web page includes a search result corresponding to a keyword input from the user, and
   wherein when it is determined that the first web page includes the search result corresponding to the keyword, it is determined whether the address of the second web page satisfies the second split display condition.

5. The method of claim 2, wherein the second split display condition comprises at least one of whether the address of the second web page comprises a uniform resource locator (URL) included in an address of the first web page, whether the address of the second web page comprises "http", and whether the second web page is set to be displayed in a separate display window; and
   the first split display condition comprises at least one of whether the address of the third web page comprises a uniform resource locator (URL) included in an address of the first web page, whether the address of the third web page comprises "http", and whether the third web page is set to be displayed in a separate display window.

6. The method of claim 2, further comprising:
   determining whether the address of the third web page corresponding to the second link satisfies the first split display condition, and when it is determined that the address of the third web page satisfies the first split display condition, displaying the third web page in the second section region.

7. The method of claim 6, wherein the displaying of the third web page in the second section region comprises displaying the third web page and the second web page to completely overlap each other while an index of the second web page and an index of the third web page do not overlap each other in a part of the second section region, and displaying the third web page on the second web page according to a generation order of web pages,
   wherein an index of each of the second web page and the third web page is in a region in which all or some of a title of each of the second web page and the third web page is displayed.

8. The method of claim 7, further comprising receiving, from the user, an input for selecting the index of the second web page, and displaying the second web page foremost in the second section region according to the input.

9. The method of claim 2, further comprising:
   receiving, from the user, an input for selecting a third link included in the second web page; and
   displaying a fourth web page corresponding to the third link in the second section region.

10. An apparatus for displaying web pages, comprising:
    a display configured to display a first web page in a display region;
    a non-transitory computer-readable storage medium storing a plurality of programs for performing a plurality of corresponding functions; and
    a processor for executing the plurality of functions of the programs stored in the storage medium, the plurality of functions including, an input controller function for receiving, from a user, an input for selecting a first link included in a first web page; and a display controller function for splitting the display region into a plurality of section regions according to the input for selecting the first link, displaying the first web page in a first section region from among the plurality of section regions, and displaying a second web page corresponding to the first link in a second section region different from the first section region;

wherein the input controller function further includes receiving, from the user, an input for selecting a second link included in the first web page after the second section region has been displayed on the display; and the plurality of functions further includes a condition determiner function for determining whether an address of a third web page corresponding to the second link satisfies a first split display condition, and when it is determined that the address of the third web page does not satisfy the first split display condition, the display controller function displays the third web page in the first section region, overlapping the first web page.

11. The apparatus of claim 10, wherein the condition determiner function further determines whether an address of the second web page satisfies second split display condition according to the input for selecting the first link, wherein the display controller function splits the display region into the plurality of section regions, displays the first web page in the first section region, and displays the second web page in the second section region, only when it is determined that the address of the second web page satisfies the second split display condition.

12. The apparatus of claim 11, wherein the display controller function displays the second web page in the display region without the display region being split into the plurality of the section regions, when it is determined that the address of the second web page does not satisfy the second split display condition.

13. The apparatus of claim 10, wherein the condition determiner function determines whether the first web page includes a search result corresponding to a keyword input from the user, and determines whether the address of the second web page satisfies the second split display condition when it is determined that the first web page includes the search result corresponding to the keyword.

14. The apparatus of claim 11, wherein the second split display condition comprises at least one of whether the address of the second web page comprises a uniform resource locator (URL) included in an address of the first web page, whether the address of the second web page comprises "http", and whether the second web page is set to be displayed in a separate display window; and the first split display condition comprises at least one of whether the address of the third web page comprises a uniform resource locator (URL) included in an address of the first web page, whether the address of the third web page comprises "http", and whether the third web page is set to be displayed in a separate display window.

15. The apparatus of claim 11, wherein the condition determiner function determines whether the address of a third web page corresponding to the second link satisfies the first split display condition according to the input for selecting the second link, and the display controller displays the third web page in the second section region when it is determined that the address of the third web page satisfies the first split display condition.

16. The apparatus of claim 15, wherein the display controller function displays the third web page and the second web page to completely overlap each other while an index of the second web page and an index of the third web page do not overlap each other in a part of the second section region, and displays the third web page on the second web page according to a generation order of web pages, wherein an index of each of the second web page and the third web page is in a region in which all or some of a title of each of the second web page and the third web page is displayed.

17. The apparatus of claim 16, wherein the input controller function receives, from the user, an input for selecting the index of the second web page, and the display controller function displays the second web page foremost in the second section region according to the input for selecting the index of the second web page.

18. The apparatus of claim 11, wherein the input controller function receives, from the user, an input for selecting a third link included in the second web page, and the display controller function displays a fourth web page corresponding to the third link in the second section region.

19. A non-transitory computer-readable recording medium having recorded thereon a computer program which, when executed by a computer, instructs the computer to perform the method comprising:

receiving, from a user, an input for selecting a first link included in the first web page;

splitting the display region into a plurality of section regions, displaying the first web page in a first section region from among the plurality of section regions, and displaying a second web page corresponding to the first link in a second section region different from the first section region;

receiving, from the user, an input for selecting a second link included in the first web page after the second section region has been displayed on the display; and determining whether an address of a third web page corresponding to the second link satisfies a split display condition, and when it is determined that the address of the third web page does not satisfy the split display condition, displaying the third web page in the first section region, overlapping the first web page.

* * * * *